(12) United States Patent
Sudo et al.

(10) Patent No.: US 7,065,852 B2
(45) Date of Patent: Jun. 27, 2006

(54) METHOD OF MANUFACTURING HYDRAULIC SHOCK ABSORBER AND PRODUCTION SYSTEM FOR SHOCK ABSORBER IN PLANT

(75) Inventors: Kimio Sudo, Tokyo (JP); Ryuji Uda, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 258 days.

(21) Appl. No.: 10/450,908

(22) PCT Filed: Dec. 26, 2001

(86) PCT No.: PCT/JP01/11455

§ 371 (c)(1),
(2), (4) Date: Dec. 11, 2003

(87) PCT Pub. No.: WO02/053934

PCT Pub. Date: Jul. 11, 2002

(65) Prior Publication Data

US 2004/0088850 A1  May 13, 2004

(30) Foreign Application Priority Data

Dec. 27, 2000  (JP)  .............................. 2000-398006
Jan. 18, 2001  (JP)  .............................. 2001-009997

(51) Int. Cl.
  *F16F 9/32*  (2006.01)
(52) U.S. Cl. ......................................... 29/434; 29/429
(58) Field of Classification Search .................. 29/434, 29/436, 890.09, 429, 801; 92/183, 181 P, 92/192
See application file for complete search history.

(56) References Cited

U.S. PATENT DOCUMENTS 4,838,393 A * 6/1989 Mourray et al. ............. 188/284
4,838,394 A * 6/1989 Lemme et al. ............ 188/299.1
5,259,294 A * 11/1993 May ......................... 92/181 P

FOREIGN PATENT DOCUMENTS

| JP | 7-286639   | 10/1995 |
| JP | 7-332423   | 12/1995 |
| JP | 10-59473   | 3/1998  |
| JP | 2000-257659 | 9/2000 |

\* cited by examiner

*Primary Examiner*—Marc Jimenez
*Assistant Examiner*—Christopher M. Koehler
(74) *Attorney, Agent, or Firm*—Rabin & Berdo, P.C.

(57) ABSTRACT

A method of manufacturing a hydraulic shock absorber is provided with a piston main body manufacturing step 21 including the process of sintering of the piston main body and the process of forming of the molded sealing are performed, a piston assembly manufacturing step 22 including process of forming of the throttle oil passage on the piston main body manufactured in the piston main body manufacturing step 21 and the assembly of valves onto the piston main body, and a hydraulic shock absorber manufacturing step 23 for manufacturing a hydraulic shock absorber using the piston assembly. In this manner, it is not necessary to provide for an intermediate inventory between each process. Furthermore inventory monitoring processes are simplified in the piston main body manufacturing step and productivity is increased since it is not necessary to monitor the inventory level with respect to a plurality of piston assembly types with different valves or throttle hydraulic passages.

3 Claims, 4 Drawing Sheets

METHOD OF MANUFACTURING HYDRAULIC SHOCK ABSORBER AND PRODUCTION SYSTEM FOR SHOCK ABSORBER IN PLANT

FIELD OF THE INVENTION

This invention relates to a method of manufacture for a hydraulic shock absorber and a factory production system therefor.

BACKGROUND OF THE INVENTION

In the prior art, the damping characteristics of a hydraulic shock absorber used in an automobile differ depending on the type of vehicle. Consequently it is necessary to manufacture a plurality of types of piston assembly from a single type of piston main body by varying the valves or the like mounted on the piston main body or by varying the shape or number of orifices stamped in the piston main body.

A prior-art example of a method for manufacturing a piston assembly as shown in FIG. 4 comprises the sequence of a process of forming a piston main body by sintering, a process of stamping an orifice in the piston main body, a process of forming a molded sealing in the piston main body and a process of mounting a valve on the piston main body. A piston assembly manufactured in the above manner is then transported to the hydraulic shock absorber manufacturing step.

However in this type of prior-art hydraulic shock absorber manufacturing process, it is necessary to monitor inventory levels in the four manufacturing steps executing respective processes. Thus the problem arises that intermediate inventory availability must be increased. In particular, in the process after stamping the orifice into the piston main body, since a plurality of piston assembly types are produced as a result of the shape or the number of orifices, it is necessary to monitor a plurality of inventory levels in response to the piston assembly type. Consequently the problem arises that time is required to adapt to variations in the production level or to variations in product design.

It is therefore an object of this invention to provide a system for a method of manufacturing a hydraulic shock absorber which is characterized by high productivity.

It is a further object of this invention to provide a factory production system for a hydraulic shock absorber which is characterized by high productivity.

DISCLOSURE OF THE INVENTION

This invention is adapted for use in a method of manufacturing a hydraulic shock absorber provided with a piston assembly. The piston assembly comprises a metallic piston main body provided with a rod through hole and formed by sintering, a throttle passage formed by a stamping process on the piston main body, a resinous molded sealing formed on the outer peripheral section of the piston main body and a valve mounted on the piston main body.

The method of manufacturing comprises a piston main body manufacturing step comprising the sequence of a process of sintering the piston main body and a process of forming a molded sealing on the piston main body, a piston assembly manufacturing step comprising the sequence of a process of forming a throttle hydraulic passage in the piston main body and a process of mounting a valve on the piston main body and a hydraulic absorber manufacturing step in which a hydraulic shock absorber is manufactured using the piston assembly manufactured in the piston assembly manufacturing step.

Since the process of forming the piston main body by sintering in the piston main body manufacturing step is performed in sequence with the step of forming the molded sealing in the piston main body, it is not necessary to provide for an intermediate inventory between the two steps. Furthermore inventory monitoring processes are simplified since it is not necessary to monitor inventory levels with respect to a plurality of piston assembly types with different valves or throttle hydraulic passages in the piston main body manufacturing step.

Since the process of forming the throttle hydraulic passage in the piston main body in the piston assembly manufacturing step is performed in sequence with the step of assembling the valve or the like on the piston main body, it is not necessary to provide for an intermediate inventory between the two steps and thus it is possible to respond rapidly to variations in the production level or design variations in the product.

BEST MODE FOR CARRYING OUT THE INVENTION

In order to describe the invention in greater detail, the preferred embodiments will be outlined below with reference to the accompanying drawings.

Figure 3:
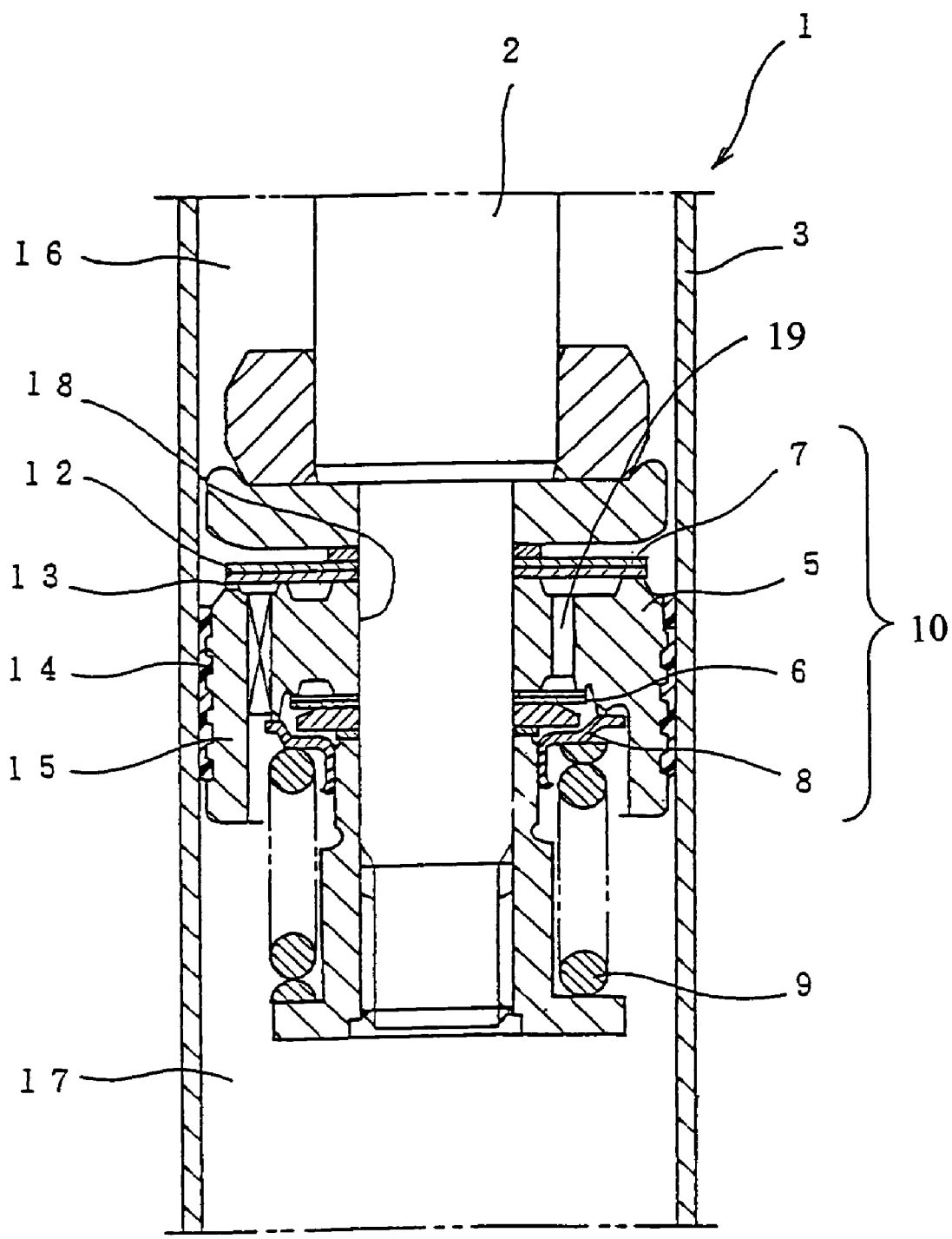
FIG. 3 is a sectional view of a piston.
Figure 4:
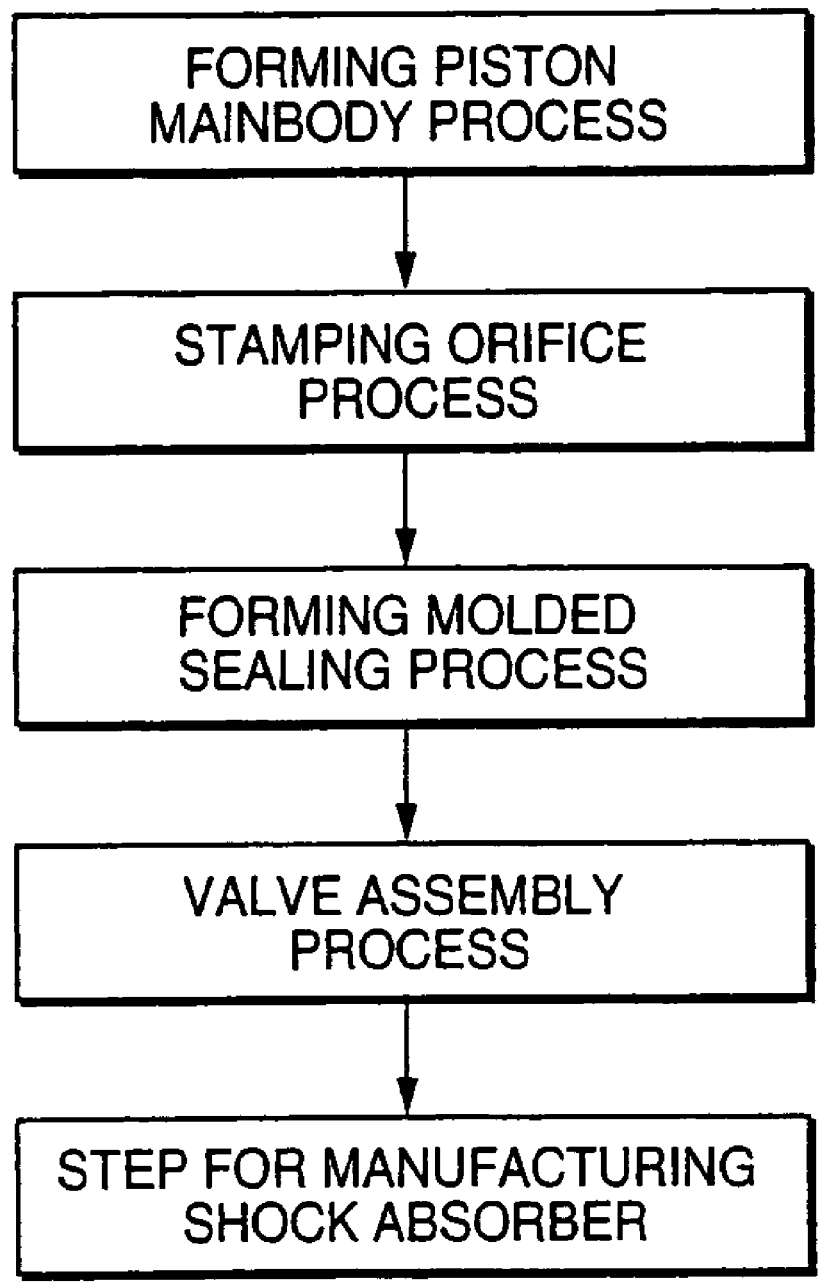
FIG. 4 shows a production process for a piston assembly according to a prior-art example.

As shown in FIG. 3, a hydraulic shock absorber 1 comprises a rod 2 connected with respect to a vehicle body, a cylinder 3 connected with respect to a wheel shaft, a piston main body 5 connected to the rod 2 and partitioning the cylinder 3 into a lower oil chamber 17 and an upper oil chamber 16 which are filled with working oil, a valve 6 generates a damping force by an extension stroke at the extremely low speed, a main valve 8 which opens against a spring 9 during the extension stroke, a relief valve 7 which opens during a compression stroke and a plurality of orifices (throttle passages) 13 which are engraved into a seat 12 corresponding to the relief valve 7 of the piston main body 5. Thus the hydraulic shock absorber 1 comprises a damping force generating mechanism for damping vibration from the vehicle wheels in the cylinder 3.

The metallic piston main body 5 comprises a rod through hole 18 passing through the rod 2, an oil passage 19 and a seat 12. These components are formed by sintering. The orifice 13 is formed by a stamping process on the piston main body 5. A resinous molded sealing 14 is formed in the outer peripheral section 15 of the piston main body 5.

When assembling the hydraulic shock absorber 1, the piston assembly 10 is formed by mounting valves 6–8 in the piston main body 5 having a molded sealing 14 and mounting the resulting device on the rod 2.

Since the damping characteristics required by the hydraulic shock absorber 1 for respective vehicles result in differences in the shape or number of orifices 13 stamped in the piston main body 5 or difference in the valves 6–8 comprising the piston assembly 10, it is necessary to produce a plurality of types of piston assembly 10 based on a single type of piston main body 5.

Figure 1:
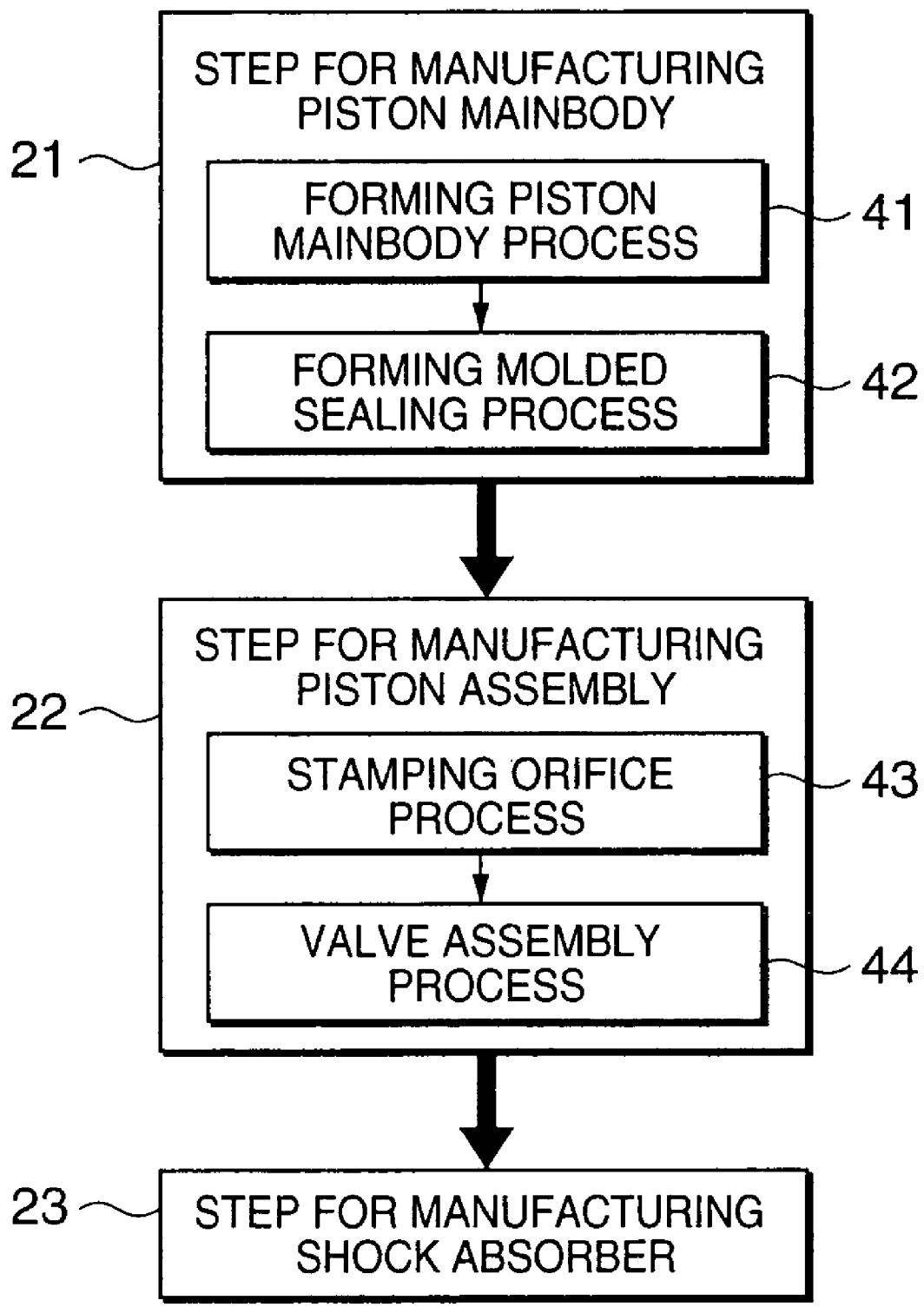
FIG. 1 shows a process of manufacturing a preferred piston assembly according to this invention.

Consequently as shown in FIG. 1, a factory production system according to this invention for producing piston assembly 10 comprises a process 41 for forming the piston main body 5 by sintering, a process 42 for forming the molded sealing 14 on the sintered piston main body 5, a process 43 for stamping the orifice 13 into the piston main body 5 having a molded sealing 14 formed thereon and separating the works into types (component number) and a process 44 for automatic assembly of the valves 6–8 onto different types of piston main body 5 having an orifice 13 formed thereon.

The process 41 is performed by a manufacturing device forming the piston main body 5 with a sintering operation. The process 42 is performed by a manufacturing device forming the molded sealing 14 on the piston main body 5. The process 43 is performed by an orifice stamping machine. The process 44 is performed by a manufacturing device performing automatic assembly of the valves 6–8.

In this aspect of this embodiment, manufacturing devices are provide in sequence to perform steps 21, 22, 23 with the work being transported by and between the steps 21–23. However it is also possible to connect the steps 21–23 using a conveyor so that the processes 41–44 are performed continuously.

Figure 2:
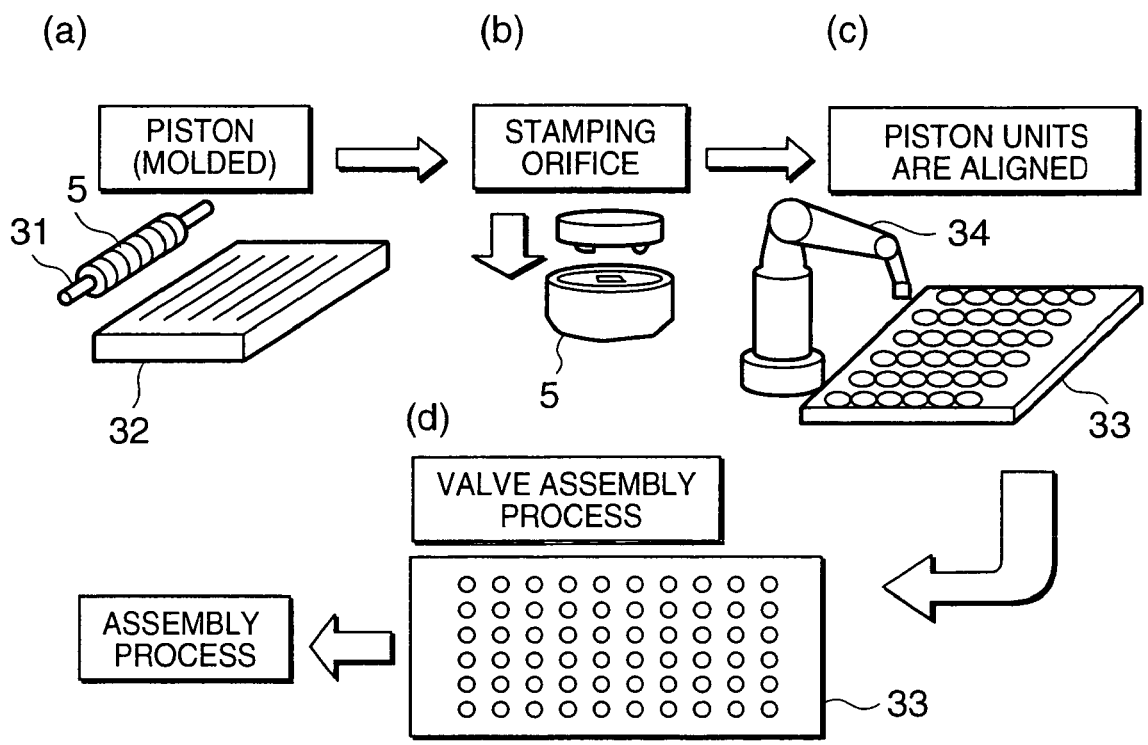
FIG. 2 shows the movement of components through respective processes.

FIG. 2 shows the movement of a work through the process 43 and the process 44. In FIG. 2, a plurality of piston main body units 5 having a molded sealing 14 formed thereon as shown in (a) in the figure are loaded onto a pallet 32 by inserting a pole 31 into the rod through hole 18. In the process 43, piston main body units 5 are taken from the pallet 32 on the pole 31 and loaded into an orifice stamping device. After an orifice 13 is stamped onto the piston main body 5 as shown by (b) in the figure, the piston main body units 5 are aligned and loaded onto a pallet 33 provided with a hole according to type by an automatic sorting device 34 as shown by (c) in the figure. In the process 44, valves 6–8 are assembled with the piston main body units 5 loaded by type onto the pallets 33 as shown by (d) in the figure in order to complete the piston assembly 10. The piston assemblies 10 loaded by type onto the pallets 33 are transported to a hydraulic shock absorber manufacturing step in which the hydraulic shock absorber 1 is assembled.

Since the process 41 of forming the piston main body 5 by sintering is performed in sequence with the process 42 of forming the molded sealing 14 in the piston main body 5, it is not necessary to provide for an intermediate inventory between the two processes 41, 42. Furthermore inventory monitoring processes are simplified since it is not necessary to monitor the inventory level with respect to a plurality of types of piston assembly 10 with different valves 6–8 or orifices 13 in the two processes 41, 42 executed up to this point.

Furthermore since the process 43 of forming the orifice 13 in the piston main body 5 is performed in sequence with the process 44 of assembling the valve 6–8 or the like in the piston main body 5, it is not necessary to provide for an intermediate inventory between the two processes 43, 44. In these two processes 43, 44, the pallets 33 are designated with respect to the same type of piston assembly 10. Thus it is possible to perform efficient manufacture of a plurality of types of piston assembly 10 and to respond rapidly to variations in the production level or design variations in the product.

In addition, the manufacturing process is performed efficiently due to the fact that the piston main body 5 manufactured in the process 42 are transported to the process 43 in a state of being inserted on the pole 31. This allows the pole 31 to be used to load the piston main body 5 into the orifice stamping device in the process 43.

Furthermore, since the piston assemblies 10 which are loaded by type onto the pallets 33 are transported to the hydraulic shock absorber 1, it is possible to perform efficient assembly of the hydraulic shock absorber 1 using pallets 33 designated for different types in the hydraulic shock absorber manufacturing step.

Although the invention has been described above by reference to certain embodiments of the invention, the invention is not limited to the embodiments described above. Modifications and variations of the embodiments described above will occur to those skilled in the art, in the light of the above teachings.

INDUSTRIAL APPLICABILITY

As shown above, a method of manufacturing a hydraulic shock absorber and a factory production system therefor according to this invention is useful as a factory production system and a method of manufacturing a hydraulic shock absorber used in an automobile. In particular, it is adapted for use as a factory production system and a method of manufacturing for mass production of a plurality of types of piston assembly

The invention claimed is:

1. A method of manufacturing a hydraulic shock absorber, the hydraulic shock absorber provided with a piston assembly comprising a metallic piston main body having a rod through hole and formed by sintering; a throttle oil passage formed by stamping the piston main body, a resinous molded sealing formed on the outer periphery of the piston main body; and a valve mounted on the piston main body; the manufacturing method comprising:

a piston main body manufacturing step in which the process of sintering of the piston main body and the process of forming of the molded sealing on the piston main body are performed in sequence;

a piston assembly manufacturing step in which the process of forming of the throttle oil passage on the piston main body and the process of assembling of valves onto the piston main body are performed in sequence; and a hydraulic shock absorber manufacturing step for manufacturing a hydraulic shock absorber using the piston assembly manufactured in the piston assembly manufacturing step.

2. The method of manufacturing a hydraulic shock absorber as defined in claim 1, wherein a piston assembly is manufactured by a factory production system, the system comprising:

a process of forming the piston main body by sintering;

a process of forming the molded sealing on the sintered piston main body;

a process of forming a throttle passage on the piston main body having a molded sealing formed thereon and sorting the piston main body units by type; and a process of assembling the valves by type with respect to piston main body units having a throttle oil passage formed thereon.

3. The method of manufacturing a hydraulic shock absorber as defined by claim 1, wherein a plurality of piston main body units manufactured in the piston main body manufacturing step are inserted onto a pole and transported to the piston assembly manufacturing step.

\* \* \* \* \*